(12) United States Patent
Petring (10) Patent No.: US 12,013,073 B2
(45) Date of Patent: Jun. 18, 2024

(54) CLOSURE APPARATUS

(71) Applicant: ROSEN Swiss AG, Stans (CH)

(72) Inventor: Jörg Petring, Lingen (DE)

(73) Assignee: ROSEN Swiss AG, Stans (CH)

( * ) Notice: Subject to any disclaimer, the term of this patent is extended or adjusted under 35 U.S.C. 154(b) by 456 days.

(21) Appl. No.: 16/639,671

(22) PCT Filed: Jul. 5, 2018

(86) PCT No.: PCT/EP2018/068281
§ 371 (c)(1),
(2) Date: Feb. 17, 2020

(87) PCT Pub. No.: WO2019/034327
PCT Pub. Date: Feb. 21, 2019

(65) Prior Publication Data
US 2020/0248859 A1    Aug. 6, 2020

(30) Foreign Application Priority Data
Aug. 16, 2017  (DE) .................... 20 2017 104 929.9

(51) Int. Cl.
*F16L 55/11* (2006.01)
*F16L 57/00* (2006.01)

(52) U.S. Cl.
CPC ....... *F16L 55/1108* (2013.01); *F16L 55/1125* (2013.01); *F16L 57/005* (2013.01)

(58) Field of Classification Search
CPC ... E02D 29/1427; F16L 55/11; F16L 55/1108; F16L 55/1125; F16L 55/132; F16L 55/136; F16L 55/128; F16L 55/1286; Y10T 70/5584; Y10T 292/0803; Y10T 292/084
USPC .................... 138/89, 96 R; 292/256.65, 257
See application file for complete search history.

(56) References Cited

U.S. PATENT DOCUMENTS

| | | | | |
|---|---|---|---|---|
| 278,670 A | * | 5/1883 | Swoboda ............... | B65D 51/26 217/86 |
| 1,216,972 A | * | 2/1917 | Ellis ......................... | F17D 5/06 220/378 |
| 1,375,645 A | * | 4/1921 | Unckrich ............ | E05B 65/0057 292/37 |
| 2,181,905 A | * | 12/1939 | McCrery ................ | B65D 15/06 229/5.5 |
| 2,797,018 A | * | 6/1957 | Worn ....................... | F16J 13/10 220/378 |
| 3,184,099 A | * | 5/1965 | Gravert .................. | B63B 19/24 292/241 |

(Continued)

FOREIGN PATENT DOCUMENTS

| | | |
|---|---|---|
| DE | 3523504 A1 | 1/1987 |
| DE | 102009017975 A1 | 7/2010 |

(Continued)

*Primary Examiner* — David R Deal
(74) *Attorney, Agent, or Firm* — Husch Blackwell LLP (57) ABSTRACT

A closure apparatus is provided for closing a pipe. The closure apparatus includes a support element, at least one sealing contact face and a closure apparatus centre axis. At least one operating apparatus with at least one adjusting element, which can be moved from a first position to a second position relative to the support element, is also provided. The closure apparatus is in a sealing position in the second position of the adjusting element.

19 Claims, 9 Drawing Sheets

(56) References Cited

U.S. PATENT DOCUMENTS

| | | | | |
|---|---|---|---|---|
| 3,543,801 A * | 12/1970 | Thayer | ................ | F16L 55/132 |
| | | | | 220/233 |
| 3,606,070 A * | 9/1971 | Shepherd | ............... | B65D 90/10 |
| | | | | 220/210 |
| 3,861,550 A * | 1/1975 | Taylor | ................... | B65D 47/36 |
| | | | | 215/250 |
| 4,288,001 A * | 9/1981 | Lankston | ................... | B01J 3/03 |
| | | | | 220/319 |
| 8,109,407 B2 * | 2/2012 | Hsiao | ............... | H01L 21/67373 |
| | | | | 220/228 |
| 8,141,591 B2 * | 3/2012 | Jaromin | ................ | F16L 55/136 |
| | | | | 220/323 |
| 8,475,575 B2 * | 7/2013 | Ono | ........................ | F16J 13/14 |
| | | | | 454/340 |
| 2003/0000590 A1 | 1/2003 | Chen | | |
| 2008/0223473 A1 * | 9/2008 | Palmer | ............... | F16L 55/1157 |
| | | | | 138/96 T |
| 2009/0301568 A1 | 12/2009 | Wilson | | |
| 2011/0260852 A1 * | 10/2011 | Rosen | ...................... | F17D 5/06 |
| | | | | 340/532 |

FOREIGN PATENT DOCUMENTS

| | | | | |
|---|---|---|---|---|
| DE | 102012023174 A1 | 6/2014 | | |
| DE | 202015002284 U1 | 4/2015 | | |
| EP | 1229173 A1 | 8/2002 | | |
| FR | 2769351 A1 | 4/1999 | | |
| GB | 2110653 A * | 6/1983 | ............. | B65D 39/12 |
| GB | 2134206 A * | 8/1984 | ............... | F16J 13/08 |
| GB | 2218179 A * | 11/1989 | ............... | F16J 13/08 |
| KR | 20130057917 A * | 6/2013 | ......... | E02D 29/1427 |
| NL | 2001969 C | 3/2010 | | |

* cited by examiner

CLOSURE APPARATUS

CROSS REFERENCE

This application claims priority to PCT Application No. PCT/EP2018/068281, filed Jul. 5, 2018, which itself claims priority to German Application No. 20 2017 104929.9, filed Aug. 16, 2017, the entirety of both of which are hereby incorporated by reference.

FIELD OF THE INVENTION

The invention relates to a closure apparatus for closing a pipe, comprising a support element, at least one sealing contact face and a closure apparatus centre axis. A closure apparatus of this kind is used, for example, for closing pipes which are used for constructing pipelines. The sealing contact face bears against the pipe surface in a position in which the pipe is closed by the closure apparatus. The closure apparatus centre axis coincides with the longitudinal centre axis of the pipe in this position.

BACKGROUND

A closure apparatus somewhat similar to this kind is known, for example, from DE 10 2009 017 975 A1. By way of being pushed in the axial direction of the pipe, the disclosed closure apparatus is partially inserted into the pipe interior of the said pipe. After insertion into the pipe, the sealing contact face bears against the pipe inner face over the entire circumference. In this case, a collar of the closure apparatus, which collar protrudes in the radial direction, bears against that end face of the pipe which is to be connected to a further pipe. In order to be able to ensure adequate leaktightness of the closure, the sealing contact face has to bear against the pipe inner face with a minimum surface pressure.

In general, a respective closure apparatus is inserted into the two openings of a pipe. As a result, the intermediate closure area which is formed in this way is intended to be protected against the ingress of rainwater and foreign bodies and therefore specifically corrosion of the pipe surface which adjoins the closure area is intended to be prevented.

In the case of this design of the closure apparatus, an immense application of force is required in order to insert the said closure apparatus into the pipe. The radial surface pressure between the sealing contact face and the pipe inner face, which radial surface pressure is required for adequate leaktightness, leads to a high axial force which is required for pushing the closure apparatus into the pipe and causes a high level of expenditure on assembly. The pushing-in operation has the further disadvantageous effect of the sealing contact face and pipe inner face rubbing against one another, as a result of which at least the softer of the two contact partners is scratched by the respectively other contact partner. This impairment of the surface properties has a negative influence on the leaktightness of the closure, in particular when the closure apparatus is used several times. Owing to the collar and the adjoining cylindrical casing-like section, use of the closure apparatus is limited to open pipe ends which run in a straight line at least in a first section. In addition, experience has shown that the collar makes it difficult for liquid to flow out of the region of the end side of the pipe and therefore encourages corrosion in the said region.

SUMMARY OF THE INVENTION

The object of the present invention is to provide a closure element which can be fitted in a simple and quick manner and provides sealing which is as procedurally reliable as possible.

According to the invention, the object is achieved by an operating apparatus with at least one adjusting element which can be moved from a first position to a second position relative to the support element. The closure apparatus is in a sealing position in the second position of the adjusting element. In this case, a force which is introduced onto the operating apparatus from the outside acts on the adjusting element in order to move the said adjusting element from the first to the second position. The closure apparatus is moved to the sealing position by the movement.

If the closure apparatus is located within the pipe with a diameter which corresponds to the closure apparatus, the sealing position is distinguished in that the sealing contact face bears against the pipe inner face and acts on the pipe surface at least with a minimum surface pressure. If, however, the closure apparatus is not located within a pipe, the sealing position is distinguished in that, in the said sealing position, the sealing contact face is at a greater distance from the closure apparatus centre axis than before the sealing position was reached.

The operating apparatus serves to transmit or convert the movement of the adjusting element to create the sealing position of the closure apparatus. The support element serves to support the operating apparatus. In this case, the support element is preferably designed in an annular manner and so as to encircle the closure apparatus centre axis. In an advantageous refinement of the invention, the closure apparatus has a plurality of, in particular two, support elements. In this case, at least one constituent part of the operating apparatus is situated between two support elements. In this way, the operating apparatus can be particularly effectively protected against environmental influences, this increasing the reliability of the said operating apparatus.

If the closure apparatus is located within the pipe in the sealing position, the closure apparatus centre axis coincides with the pipe longitudinal centre axis. Both the pipe inner face and the sealing contact face preferably have a round cross section as viewed in a plane which is orthogonal in relation to the closure apparatus centre axis.

If the sealing contact face has a different cross section, in particular an elliptical cross section, the closure apparatus centre axis intersects a cross section through the sealing contact face at a point at which the straight line which connects the two points of the sealing contact face that are at the furthest distance from one another in cross section intersects the straight line which connects the two points of the sealing contact face that are at the least distance from one another in cross section.

Since the closure apparatus is moved to the sealing position only at that location at which it is also intended to remain in the sealing position, the fitting and also the sealing quality of the closure apparatus are improved. While the adjusting element is in its first position and a lower surface pressure than the minimum surface pressure acts on the pipe inner wall by way of the sealing contact face, the closure apparatus is positioned within the pipe to be closed. Owing to the low axial resistance force due to the low or lacking surface pressure, the closure apparatus can be positioned at any location and with application of only little force within the pipe with a corresponding inside diameter, this making fitting substantially easier. Particularly reliable sealing is then ensured in the sealing position since the sealing face was modified only at most to an insignificant extent by rubbing against the pipe inner face beforehand. The sealing contact face and the pipe inner face are not moved relative to one another in the sealing position, as a result of which sealing is particularly procedurally reliable.

The adjusting element preferably can be pivoted or can be rotated about an operating axis relative to the support element. The operating axis is tilted at most by 10° in relation to the closure apparatus centre axis. The adjusting element is preferably in the form of a lever to be flipped or that of a screw, as a result of which a translatory movement is superimposed on the rotational movement. Owing to the rotation of the adjustment element about the operating axis, the closure apparatus can be operated in a particularly ergonomic manner by the fitter performing installation who moves the adjusting element. In particular, the rotation about the operating axis which is substantially parallel to the closure apparatus centre axis can be carried out in a particularly reliable manner in this case since the closure apparatus forms a counterforce, which ensures secure standing of the closure apparatus, by way of the sealing contact face resting on the pipe inner face. Owing to the manner of introduction of movement, rapid fitting of closure elements according to the invention is also ensured when the said closure elements are repeatedly moved to the sealing position by the fitter.

In an alternative preferred embodiment, the adjusting element can be displaced parallel to the operating axis relative to the support element. Owing to the axial displacement from its first position to its second position, it is possible to move a plurality of adjusting elements to the second position at the same time in a particularly simple manner. When using an appropriate tool, the fitter is able to move the adjusting elements in parallel at the same time by simply introducing force in the axial direction, this accelerating fitting.

The operating apparatus particularly preferably comprises an eccentric element. The eccentric element can be pivoted about the operating axis and has a sliding surface which is averted from the operating axis and is at a varying distance from the operating axis. The sliding surface preferably has an extent which is parallel to the operating axis. The sliding surface runs at least partially about the operating axis with a varying radius. Owing to the pivoting of the eccentric element, the distance from the sliding surface of the eccentric element to the operating axis changes in a radial direction which is stationary relative to the operating axis. The sliding surface serves to move a further element of the closure apparatus in the said direction, as a result of which the closure apparatus is moved to the sealing position. A rotational movement about the operating axis is converted into a translatory movement by the eccentric element. Owing to this conversion of movement, the desired surface pressure on the sealing contact face, which surface pressure is required in the sealing position of the closure apparatus, can be produced by a force in the radial direction, wherein proportionally only a considerably lower force or a lower torque has to be introduced into the adjusting element. This reduces the burden on the fitter and assembly is simplified.

In an alternative particularly preferred refinement of the invention, the operating apparatus comprises a pushing element which can be moved parallel to the operating axis. The pushing element likewise has a sliding surface which is averted from the operating axis and is at a varying distance from the operating axis. In this case, the distance of the sliding surface from the operating axis varies at least in the axial direction. Owing to the axial movement of the pushing element, a movement in the radial direction is caused by a further element of the closure apparatus, which further element bears against the sliding surface. Once again, the variable gradient of the sliding surface renders it possible to produce an adequate surface pressure on the sealing contact face by a relatively low application of force by the fitter, as a result of which fitting is made easier once again.

In an advantageous refinement of the invention, the operating apparatus comprises, instead of the pushing element, a cone element with the sliding surface which is averted from the operating axis and is at a varying distance from the operating axis. The cone element is designed in an axially symmetrical manner in relation to the operating axis. The use of a cone element of this kind renders possible the desired conversion, wherein a movement with a rotational component and a translatory component parallel to the operating axis is converted into a purely translatory movement in the radial direction. The use of the cone element instead of the pushing element simplifies the design of the closure apparatus in as much as the said cone element produces a translatory movement which is independent of its own rotation. Owing to the mounting which is simplified in this way, the functioning of the closure apparatus is particularly reliable and sealing off is particularly procedurally reliable.

The conversion arrangement is preferably self-locking, depending on the gradient of the sliding surface relative to the operating axis. In this case, the eccentric element, the pushing element or the cone element are actively moved indirectly or directly by the adjusting element, as a result of which an element which bears against the sliding surface can be moved. However, a movement of the component which bears against the other sliding surface does not cause any movement of the eccentric element, pushing element or cone element. Both the eccentric element and the cone element are preferably arranged so as to bear against the adjusting element and are fixed to it. As a result, the friction within the operating apparatus is reduced to a minimum amount.

The adjusting element is particularly preferably formed in one piece with the eccentric element, the pushing element or the cone element. As a result, the number of components which are subject to wear is reduced and the reliability of the closure apparatus is increased.

The closure apparatus preferably comprises a transmission element which is shifted by the movement of the adjusting element from the first to the second position. In this case, the said transmission element is shifted in a translatory manner and parallel to a transmission axis. The transmission element serves to transmit the force which acts on the closure apparatus for the purpose of producing the required surface pressure on the sealing contact face. The transmission element is preferably at least partially arranged in a groove or a gap of the support element and each transmission element is associated with an adjusting element. Owing to this form of mobility, the transmission element is particularly unsusceptible to wear. The transmission element renders possible reliable transmission of the introduced force for producing the sealing position and therefore ensures procedurally reliable sealing off of the pipe.

The transmission axis is preferably tilted by 80° to 100° relative to the closure apparatus centre axis. In this case, the said transmission axis is at a distance from the closure apparatus centre axis of at most one fifth of the smallest distance of the sealing contact face from the closure apparatus centre axis. Owing to the transmission axis which is oriented substantially radially with respect to the closure apparatus centre axis, a force which is introduced onto the adjusting element can be transmitted to the sealing contact face in a particularly simple manner and the distance between the sealing contact face and the adjusting element can be bridged over the shortest possible path. Owing to the transmission of the force on the shortest path, the risk of failure of the closure apparatus is minimized and fitting is simplified.

In an alternative preferred refinement of the invention, the transmission axis is arranged parallel to the closure apparatus centre axis. Since the transmission element is moved parallel to the closure apparatus centre axis, the surface pressure on the at least one sealing contact face can be increased by a movement of a relatively small number of transmission elements. Owing to the action of force onto the sealing contact face, which action of force is rendered possible in this way and is more homogeneous over the entire circumference, sealing off is particularly reliable. At the same time, a particularly high degree of security against failure of the closure apparatus is achieved by the possible reduction in the number of transmission elements when a build-up of surface pressure which is more homogeneous over the entire circumference is obtained.

The transmission element is particularly preferably arranged in a manner bearing against the sliding surface and is moved by the movement of the sliding element. Since that region of the transmission element which bears against the sliding surface cannot follow the movement of the said sliding surface on account of the limited mobility of the said transmission element, the transmission element slides on the sliding surface with friction as the adjusting element is moved from its first position to its second position. In the process, the distance of the transmission element from the operating axis grows in size, and also the distance of the sliding surface from the operating axis in the direction of the transmission axis increases. Owing to the transmission element bearing directly against the sliding surface, only a minimum number of elements is required for the closure apparatus, as a result of which the probability of failure of the closure apparatus is reduced. The gradient of the change in distance of the sliding surface, i.e. the change in distance by angle (eccentric element) or by travel in the axial direction (pushing element or cone element), determines the ratio with which the movement of the adjusting element is converted into the movement of the transition element. This embodiment of the closure apparatus according to the invention creates a particularly simple manner of movement conversion. The particularly simple design increases the reliability of sealing off. The sliding surface is preferably shaped such that the movable connection of the transmission element and the sliding surface is self-locking. Specifically, this means that the transmission element can be moved by a movement of the sliding surface but, conversely, the sliding surface cannot be moved by a movement of the transmission element. A securing element which fixes the operating apparatus in the sealing position is not required on account of this self-locking arrangement, as a result of which the procedural reliability of sealing off is increased by the closure apparatus in turn.

At least one guide arrangement which guides the movement of the transmission element parallel to the transmission direction is preferably arranged between the support element and the transmission element. The guide arrangement ensures exact shifting of the transmission element in the desired direction of movement and therefore a particularly homogeneous increase in the surface pressure on the sealing contact face within the pipe interior when the adjusting element is moved from its first to its second position. The guide arrangement prevents, for example, tilting of the transmission element within the support element. This both simplifies fitting and renders the closing process procedurally more reliable.

The closure apparatus preferably comprises at least three transmission elements with, in each case, at least one pressing face which is averted from the closure apparatus centre axis. In the sealing position of the closure element, the pressing face differs from an imaginary circular-cylindrical lateral surface by at most one fifth of the radius of the circular-cylindrical lateral surface. In this case, the axis of symmetry of the circular-cylindrical lateral surface coincides with the closure apparatus centre axis. In the sealing position, the pressing face faces the pipe inner face when the closure apparatus is located within the pipe interior, and the transmission elements can be moved in a direction which is radial relative to the closure apparatus centre axis. The said pressing face is that surface of the transmission element which is at the furthest distance from the closure apparatus centre axis. In the sealing position, the pressing face bears either directly against the pipe inner face or exerts a pressure on the said pipe inner face indirectly, by means of a bearing further component of the closure apparatus. The pressing faces preferably have a cross section in the form of an arc of a circle when viewed in the direction of the closure apparatus centre axis, in order to form a particularly homogeneous surface pressure in comparison to a pipe inner face with a round cross section. If the pressing face bears directly against the pipe inner face within the pipe in the sealing position, the circular-cylindrical lateral surface coincides with the pipe inner face. At least three transmission elements are particularly advantageous since any desired proportion of the circumference of the closure apparatus can be formed or force can be applied to the sealing contact face by way of this number of transmission elements. The advantage of pressing faces which are formed in this way is the possibility of particularly homogeneous surface pressure on the sealing contact face, as a result of which particularly reliable sealing off is achieved.

If a further element of the closure apparatus is located between the pressing face and the pipe inner face within the pipe interior in the sealing position of the closure apparatus, the pressing face preferably has a recess which corresponds to the shape of the said element in order to position the said element in a particularly reliable manner.

When viewed in the direction of the closure apparatus centre axis, the pressing faces of the transmission elements are particularly preferably arranged so as to run around the closure apparatus centre axis over the entire circumference. This is achieved by the flush contact with the pipe inner face over the entire circumference in the circumferential direction. The pressing faces of the transmission elements are at a distance from one another in the tangential direction of at most one tenth of their minimum distance from the closure apparatus centre axis in the sealing position of the closure apparatus. Therefore, a force acts on the pipe inner face over the entire circumference by the pressing faces in the sealing position, either directly or indirectly if a further element is arranged between the pressing face and the pipe inner face.

The pressing faces together form an overall pressing face which surrounds the closure apparatus centre axis and has at most a small number of interruptions and of which the distance from the closure apparatus centre axis can change in a uniform manner and is at a maximum in the sealing position. Owing to the possibility of "contraction" of the transmission elements over the entire circumference, fitting of the closure apparatus is significantly simplified. While the adjusting element is arranged in the first position and the pressing faces have a smaller radius than in the sealing position, the closure apparatus can be easily displaced in the axial direction within the pipe. In the event of the subsequent movement of the closure apparatus to the sealing position, all pressing faces are moved radially in the direction of the pipe inner face, as a result of which wear of the sealing contact face is minimal.

In an advantageous refinement of the invention, when the adjusting element is in the first position, two adjacent transmission elements overlap by way of in each case one side section when the said transmission elements are viewed in the direction of the closure apparatus centre axis. Owing to the superimposition of the side sections, it is possible, in the sealing position in which the overall pressing face is at its maximum radius, for only slight gaps to be produced between two adjacent pressing faces in the tangential direction. Since the transmission axes of the transmission elements are preferably each oriented radially relative to the closure apparatus centre axis, in the event of a movement of the transmission elements in the direction of the closure apparatus centre axis, the side sections of the said transmission elements overlap in order to render possible a closed overall pressing face in the sealing position. In this case, the movement of the transmission elements relative to one another causes the said transmission elements to move closer to one another, this resulting in the superimposition of the side sections. The largely gap-free design of the overall pressing face in the sealing position rendered possible in this way allows the pipe to be sealed off by the closure apparatus in a particularly procedurally reliable manner.

The transmission elements preferably have two side sections which delimit a middle section. The thickness of the side sections, which thickness is measured in the direction of the closure apparatus centre axis, is lower than the thickness of the middle section by at least one third, in particular by one half, the thickness of the said middle section. In this case, the side sections of two transmission elements, which side sections face one another, are positioned such that they adjoin one another in the axial direction, at least when the adjusting element is in the first position. Owing to the growth of the overall pressing face circumference when the closure apparatus moves to the sealing position, the side sections are displaced towards one another in as much as the face, at which they overlap, reduces in size. Owing to the side sections engaging in a respective opposite recess, which is produced on account of the lower thickness of the side sections in relation to the middle section and on account of the different axial positioning of adjacent side sections, the distance between the adjacent pressing faces does not necessarily increase when the closure apparatus moves to the sealing position, but only one-sided recesses are formed in the pressing face, the extent of which recesses in the axial direction is smaller than the thickness of the middle section. The thickness of the side sections is particularly preferably half the size of that of the middle section since, in this way, these recesses extend only over half the width of the pressing face and the width of the middle sections is equal to the width of the overall pressing face. Overall, a particularly homogeneous surface pressure between the pipe inner face and the sealing contact face is produced by this refinement, even in the region of the side sections, as a result of which sealing is particularly reliable.

In an alternative preferred embodiment, the adjusting element can be moved from the first to the second position by a movement in a direction which is tilted through 70° to 110° in relation to the closure apparatus centre axis. Owing to this form of the movement of the adjusting element, the said movement is converted into a radial contact-pressure on the sealing contact face in a particularly simple manner since the movement direction of the adjusting element and the direction in which the surface pressure on the sealing contact face acts can be arranged in one plane in relation to one another. This renders possible a simple conversion of movement and therefore a high degree of reliability of the closure apparatus. In this case, the movement direction of the adjusting element is substantially directly parallel to the direction of action of the surface pressure on the sealing contact face. The surface pressure can therefore be produced directly by displacing the adjusting element, this rendering possible a design of the closure apparatus which is as simple as possible and therefore increasing the reliability of the said closure apparatus. The adjusting element and the transmission element are particularly preferably in one piece in this refinement.

In a further alternative preferred embodiment, energy is released by at least one energy store when the second position of the adjusting element is reached. This energy serves to produce the sealing position. The energy store is preferably a spring which is in a tensioned state provided that the adjusting element is arranged in its first position. When the second position of the adjusting element is reached, the spring is released and stored energy is released by the said spring. The force which is exerted by the energy store creates a surface pressure on the sealing contact face. This embodiment of the closure apparatus can be fitted in a particularly simple and quick manner since the fitter does not have to introduce any force into the closure apparatus for the purpose of producing the required surface pressure. Furthermore, the energy store can be set such that homogeneous surface pressure of an optimum magnitude is achieved in this way, this ensuring particularly reliable sealing off.

The closure apparatus preferably comprises a sealing element which has the sealing contact face. Therefore, the sealing element bears directly against the pipe inner face in the sealing position. Owing to the separation of the sealing element and the operating apparatus or transmission element, the respectively optimum materials can be used both for the sealing element and for the elements of the operating apparatus, and replacement of the sealing contact face can be simplified. Specifically, an elastic material for reliably bearing against the pipe inner face can be used for the sealing element, while stiffer materials are used for force-transmitting elements of the operating apparatus. Owing to this separation of the closure apparatus constituent parts, the functioning of the said closure apparatus constituent parts and the expenditure required for the respective replacement is optimized and therefore sealing off takes place in a particularly reliable manner.

The closure apparatus preferably has precisely one sealing element which is designed as an annular seal that encircles the closure apparatus centre axis. This sealing element has the at least one sealing contact face. The annular seal bears against the pipe inner face over the entire circumference in the sealing position, as a result of which the at least one sealing contact face is also substantially in the form of a sealing contact face. The annular seal can be designed both as a cross seal and as a sealing ring with a cross section which is substantially round in the relaxed state. A cross seal preferably has two sealing contact faces in the sealing position. The sealing element has a larger outer radius than the support element at each point along the circumference of the closure apparatus in the sealing position, so that only the sealing element is in contact with the pipe inner face. One advantage of the annular seal is particularly procedurally reliable sealing off by way of the only one sealing element having a sealing contact face that completely encircles the closure apparatus centre axis and that has a constant width on account of the constant cross section.

The sealing element particularly preferably bears at least partially against the transmission element in the sealing position. Owing to the contact between the sealing element and the transmission element, the force which produces the required surface pressure is transmitted directly from the transmission element to the sealing element. This form of transmission reduces the risk of failure of the closure apparatus and therefore makes sealing off particularly reliable. If the transmission element can be moved in a translatory manner, parallel to the closure apparatus centre axis, the surface pressure is achieved by pinching the sealing element in the axial direction. In this case, a portion of the sealing element is pushed in the radial direction by the force of the transmission element.

In an advantageous refinement of the invention, the support element consists predominantly of a fibre-reinforced polymer composite, in particular a polypropylene/glass-fibre composite. This material ensures adequate stability of the support element. In addition, the choice of material ensures a low weight of the support element. This simplifies fitting of the closure element, wherein the stability renders possible procedurally reliable sealing off.

The closure apparatus preferably has an optical indicator which indicates the position of the adjusting element. Owing to the optical identification of the position, the fitter can already identify from a relatively large distance whether the closure apparatus has been moved to the sealing position. This renders possible rapid monitoring of fitting, in particular since closure apparatuses which are at a distance from the end side of the pipe can also be monitored from outside the pipe by the indicator. The optical indicator is, for example, a coloured-in region of the adjusting element or of the transmission element that is visible through a recess in the closure apparatus only when the sealing position is at least partially reached. Particularly in the case of a plurality of adjusting elements, a plurality of indicators of this kind can preferably be provided in a manner distributed in the circumferential direction, wherein an indicator is preferably associated with each adjusting element.

A gas- and steam-permeable membrane, which renders possible the passage of gas and steam through the closure apparatus, is preferably arranged on the support element. The membrane is particularly preferably arranged centrally in the closure apparatus, and therefore the closure apparatus centre axis intersects the membrane. The membrane is preferably injection-moulded into the support element or screwed to the support element during production of the said support element. The passage of gas which is possible through the membrane ensures ventilation of the pipe interior, which is situated between the closure apparatuses, when the closed pipe is stored in the environment. The ability for air to be discharged from this space prevents a pressure gradient forming between the closed-off pipe interior and the environment, as a result of which an axial force would act on the closure apparatus. This axial force could displace the closure apparatus relative to the pipe inner face and therefore put reliable sealing off at risk.

The membrane preferably withstands a water column of at least 100 mm and is impermeable to particles of dust with a diameter of more than six micrometres. As a result, the pipe interior is particularly effectively protected against the ingress of liquids and foreign bodies.

The membrane is preferably open to diffusion and renders possible, in conjunction with a high heating capacity of the pipe, the formation of a microclimate within the pipe interior. In the microclimate, temperature fluctuations take place in a delayed manner relative to the environment and the temperature never drops below the dew point since a reduction in the relative atmospheric humidity takes place owing to an exchange of air with the environment before the dew point is reached.

Handles are particularly preferably arranged on the support element. The fitter can use these handles to position the closure apparatus, which is to be fitted, within the pipe in a particularly simple manner.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 5a shows a side view, with broken-away portions, of a third closure apparatus according to the invention with cone elements.

FIG. 5b shows an enlargement of the circled broken-away portion in the side view in accordance with FIG. 5a.

FIG. 6b shows an enlargement of the circled broken-away portion in the side view in accordance with FIG. 6a.

DETAILED DESCRIPTION OF THE DRAWINGS

The features of the exemplary embodiments according to the invention explained below can also be subjects of the invention individually or in combinations other than those illustrated or described, but always at least in combination with the features of Claim 1. Parts which have the same function are provided with identical reference numerals where appropriate.

Figure 1:
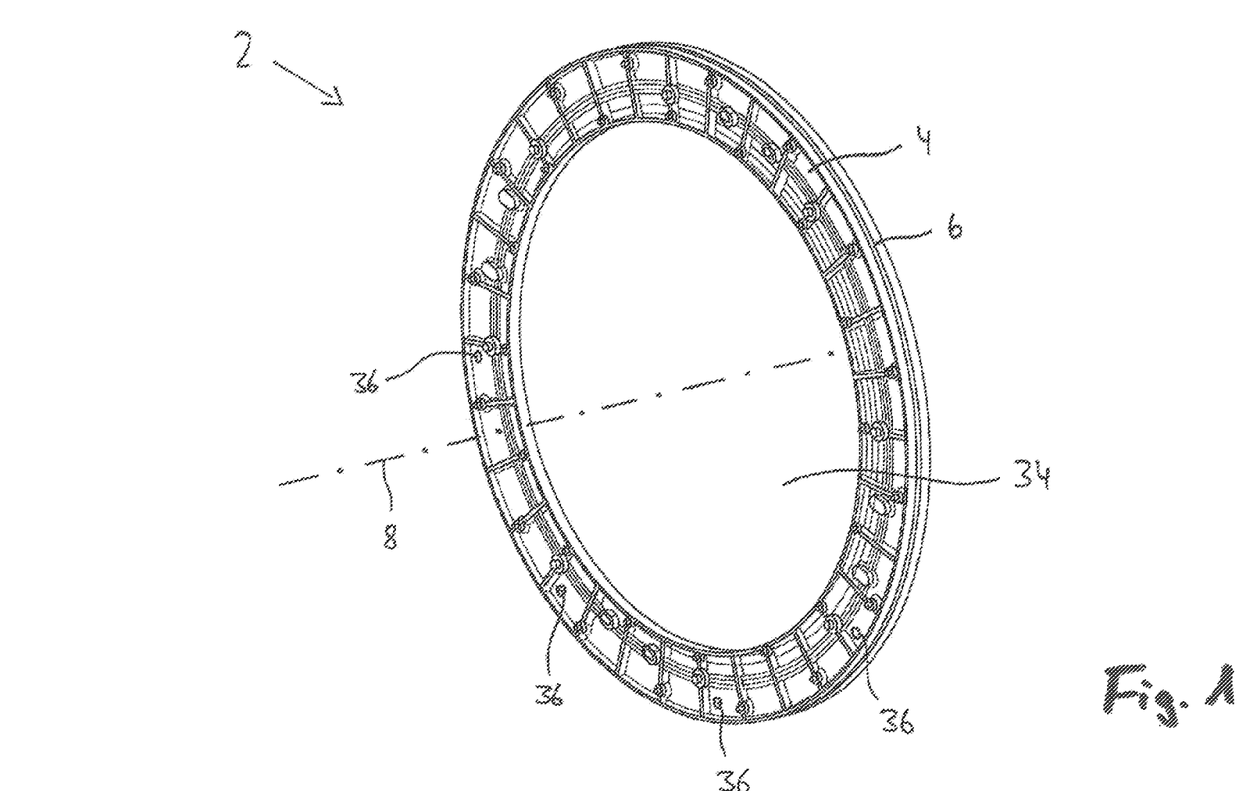
FIG. 1 shows a perspective illustration of a first closure apparatus according to the invention.

FIG. 1 shows a perspective illustration of a closure apparatus 2 for closing a pipe. The closure apparatus 2 has a support element 4 and a sealing contact face 6. A closure apparatus centre axis 8 intersects the closure apparatus 2 at its midpoint. The outer radius of the closure apparatus 2 is constant along its circumference.

Figure 2A:
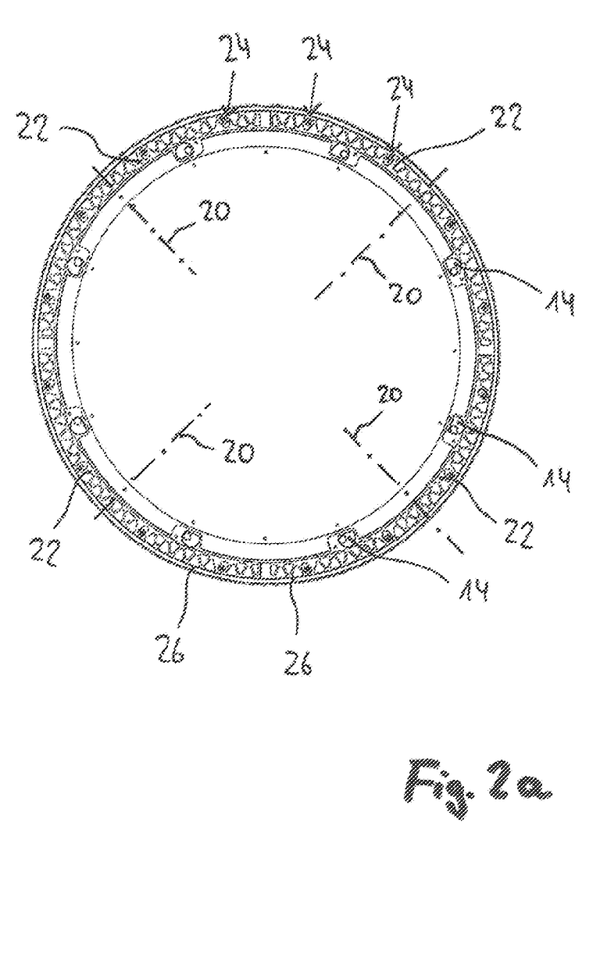
FIG. 2a shows a plan view, in the axial direction, of an inner part of the first closure apparatus according to the invention with eccentric elements, without illustrating any part of the support element.
Figures 5A, 5B:
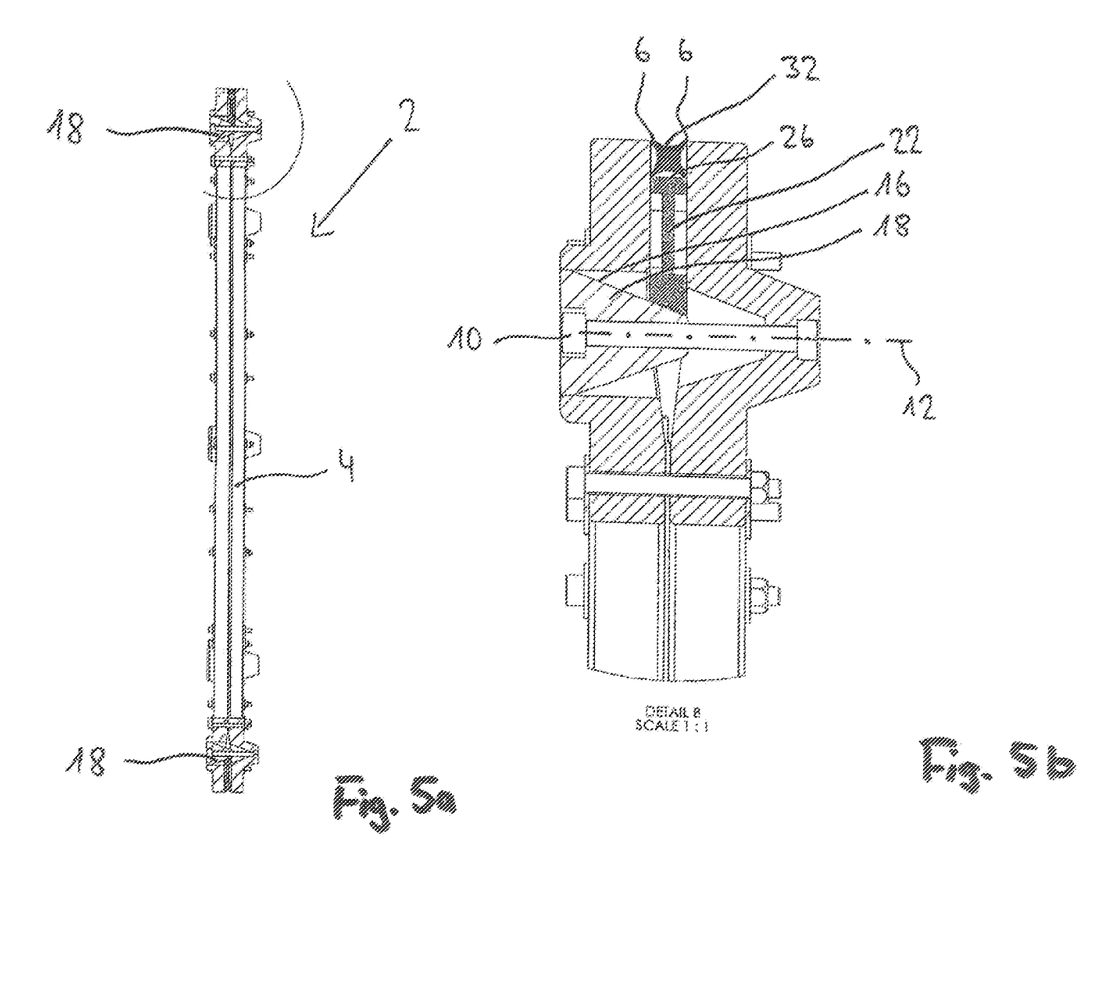
Figure 6A:
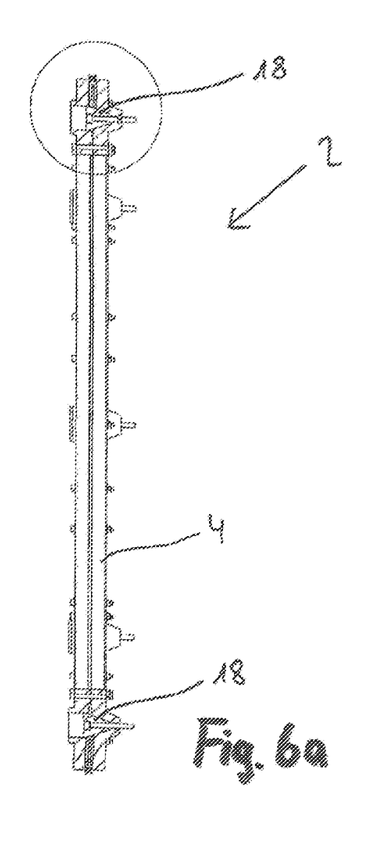
FIG. 6a shows a side view, with broken-away portions, of the third closure apparatus according to the invention, wherein the closure apparatus is in the sealing position.
Figure 6B:
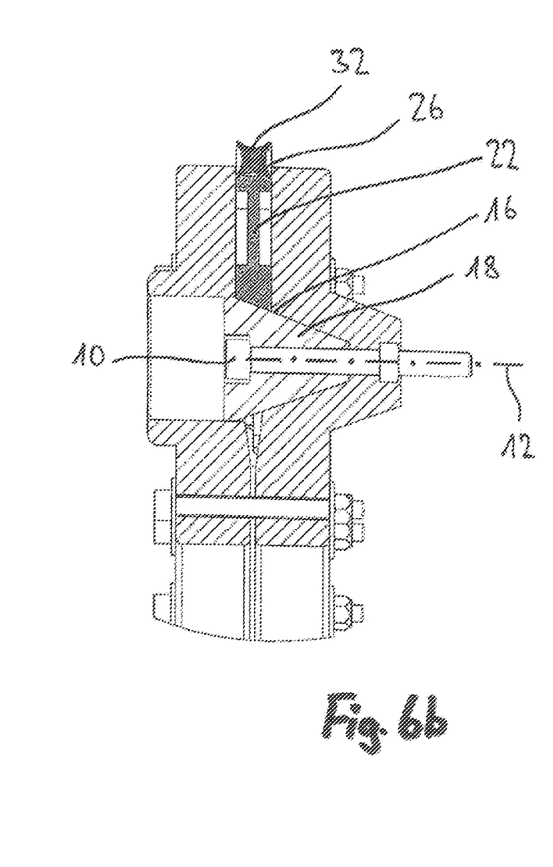
Figure 8A:
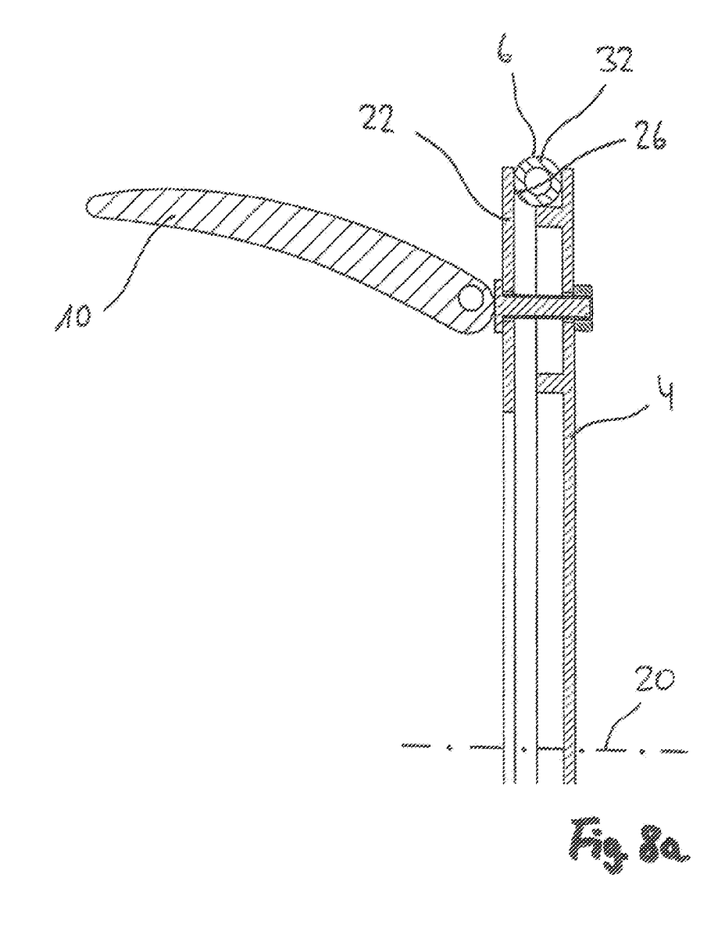
FIG. 8a shows an enlargement of an operating apparatus of the fourth closure apparatus according to the invention, wherein the adjusting element is in the first position.
Figure 8B:
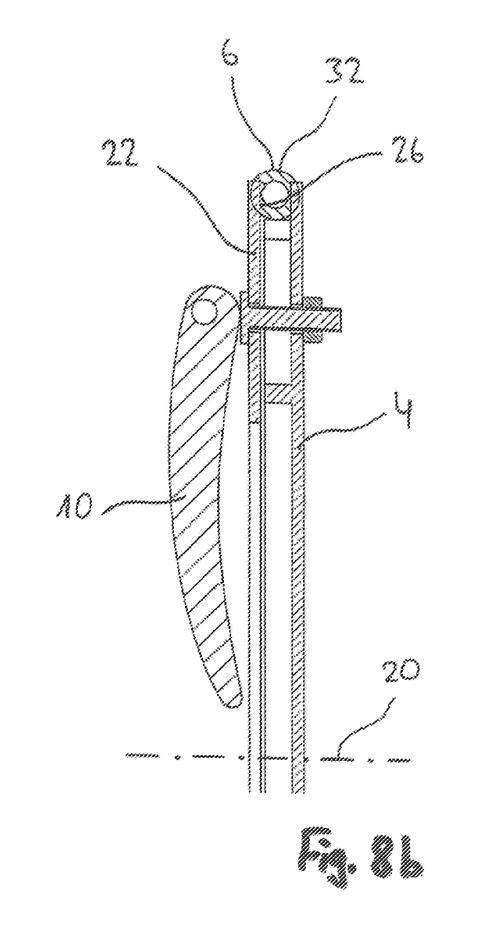
FIG. 8b shows an enlargement of an operating apparatus of the fourth closure apparatus according to the invention, wherein the adjusting element is in the second position.

The closure apparatus 2 has an adjusting element 10 which is illustrated in FIGS. 3c, 5b, 6b, 8a and 8b, amongst others. This adjusting element 10 can be moved from a first position to a second position relative to the support element 4. In FIGS. 2a, 5b and 8a, the adjusting element 10 of the respectively illustrated embodiment is in its respective first position. FIGS. 2a, 6b and 8b show the adjusting elements 10 of the same exemplary embodiments in their second position in each case.

The closure apparatus 2 is in its sealing position in the second position of the adjusting element 10. In the sealing position, the sealing contact face 6, when the closure apparatus 2 is located within a pipe with a corresponding diameter, bears against the pipe inner face of the said pipe and acts on the said pipe inner face with a minimum surface pressure. Outside the pipe, the sealing position of the closure apparatus 2 is distinguished in that the sealing contact face 6 of the closure apparatus 2 is at the maximum distance from the closure apparatus centre axis 8 in the said sealing position.

The adjusting element 10 can be pivoted (first, second and fourth embodiments) or can be rotated (third embodiment) about an operating axis 12 relative to the support element 4. In the first two embodiments, which are illustrated by FIGS. 2a, 2b, 3b, 3c and 4, the operating apparatus comprises an eccentric element 14 which can be pivoted about the operating axis 12. The eccentric element 14 has a sliding surface 16 which is averted from the operating axis 12 and is at a varying distance from the operating axis 12.

As an alternative, the operating apparatus comprises a cone element 18 which is illustrated in the third embodiment in accordance with FIGS. 5a, 5b, 6a and 6b. The cone element 18 can be moved parallel to the operating axis 12. The cone element 18 also has a sliding surface 16 which is averted from the operating axis 12 and is at a varying distance from the operating axis 12.

Amongst others, FIGS. 2a, 5b and 8a show a transmission element 22 which is shifted in a translatory manner, parallel to a transmission axis 20, by the movement of the adjusting element 10 from the first to the second position. In the first, second and third embodiments, the transmission element bears against the sliding surface and is at a distance from the operating axis owing to its rotation. In the embodiments in accordance with FIGS. 2a and 5b, the transmission axis 20 is arranged orthogonally in relation to the closure apparatus centre axis 8. In contrast to this, in the fourth exemplary embodiment in accordance with FIGS. 7, 8a and 8b, the said transmission axis is arranged parallel to the closure apparatus centre axis 8.

Figure 2B:
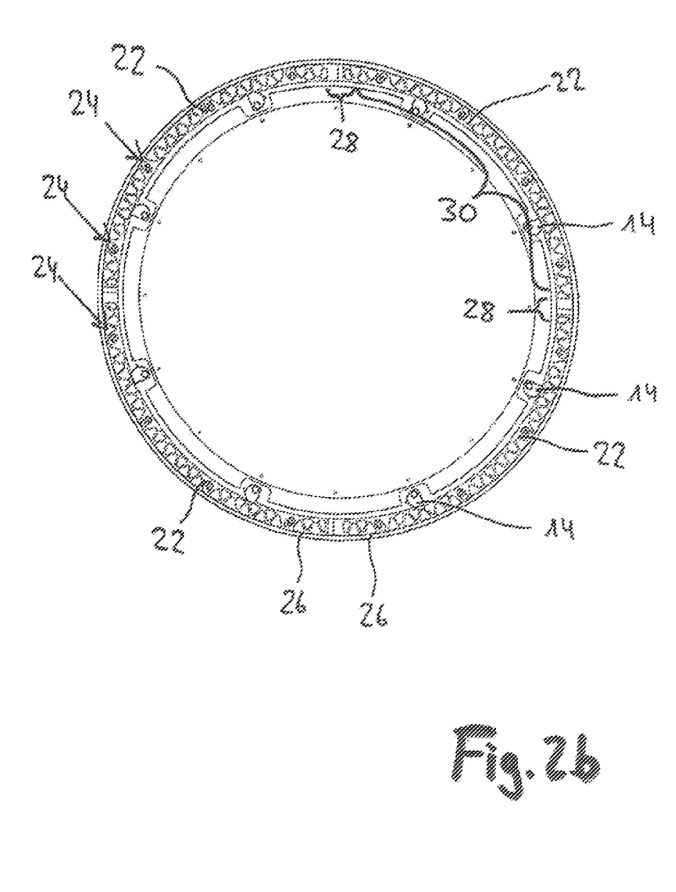
FIG. 2b shows a plan view, in the axial direction, of the inner part of the first closure apparatus according to the invention, wherein the closure apparatus is in a sealing position.
Figure 4:
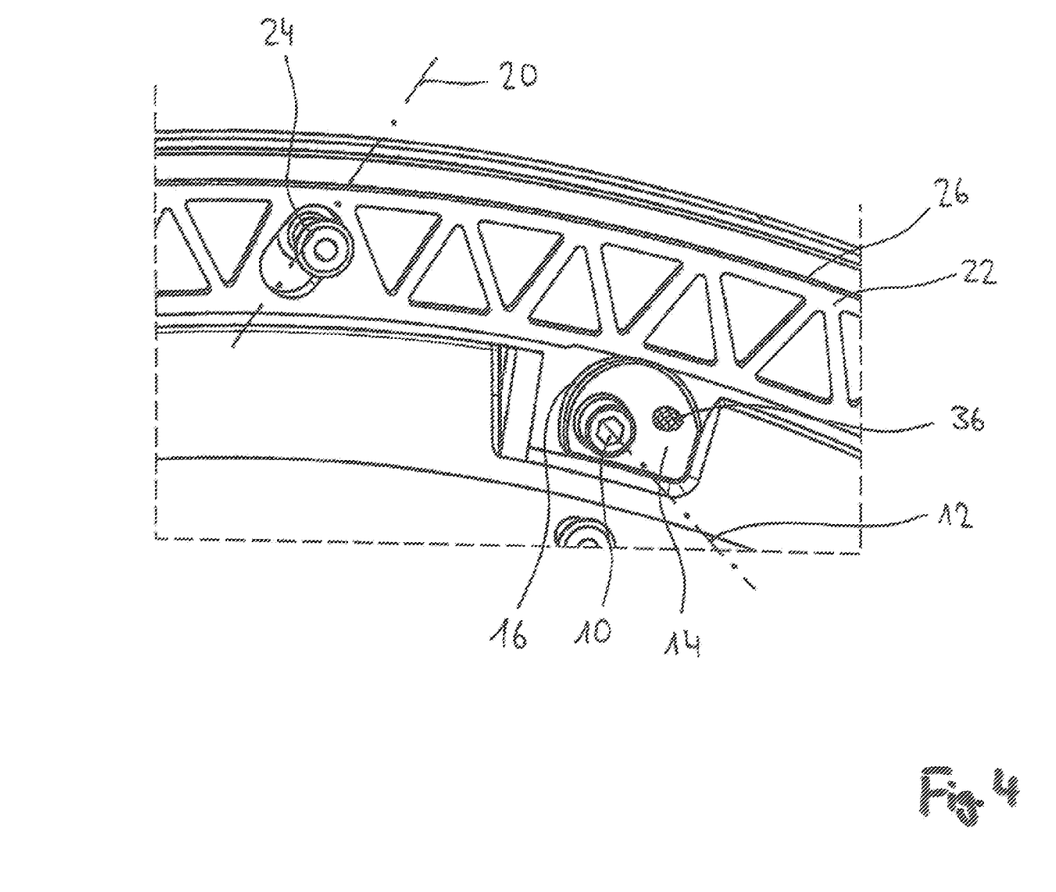
FIG. 4 shows a perspective illustration of a detail of a portion of the first closure apparatus according to the invention with eccentric elements.
Figure 7:
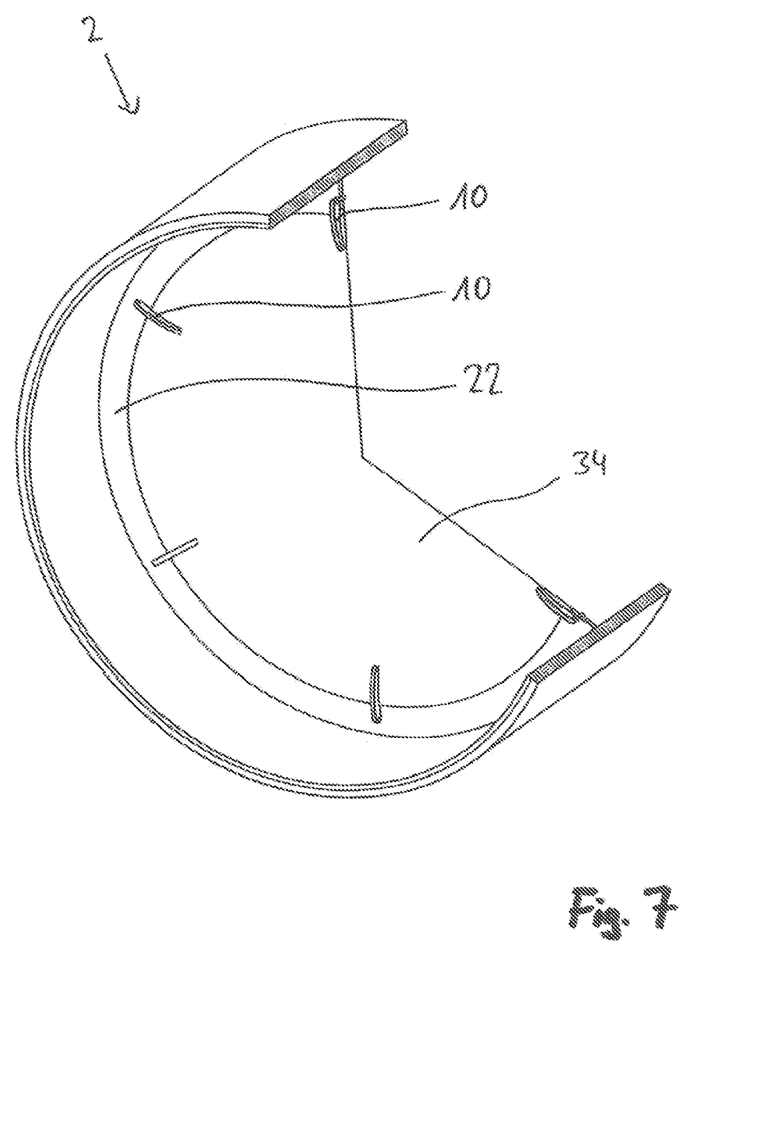
FIG. 7 shows a perspective illustration of a fourth closure apparatus according to the invention with a portion of a pipe which is to be closed, respectively with a broken-away portion.

FIGS. 2a, 2b and 4 show a guide arrangement 24 by which the transmission element 22 is guided parallel to the transmission axis 20 relative to the support element 4. The guide arrangement comprises firstly an elongate hole in the transmission element and secondly a guide pin in the support element. While the embodiment of the closure apparatus 2 according to the invention in accordance with FIGS. 2a and 2b has four transmission elements 22, the embodiment in accordance with FIGS. 8a and 8b has one transmission element 22. The four transmission elements 22 of the first embodiment mentioned each have a pressing face 26 which is averted from the closure apparatus centre axis 8, which pressing faces are arranged in an imaginary circular-cylindrical lateral surface in the sealing position of the closure element 10, the axis of symmetry of the said circular-cylindrical lateral surface coinciding with the closure apparatus centre axis 8. In this case, the pressing faces 26 run around the closure apparatus centre axis 8 or the closure apparatus 2 itself over the entire circumference. However, the pressing face of the transmission element in FIGS. 7 and 8 is arranged perpendicular to the closure apparatus centre axis and the one transmission element is axially displaceable.

Figure 9:
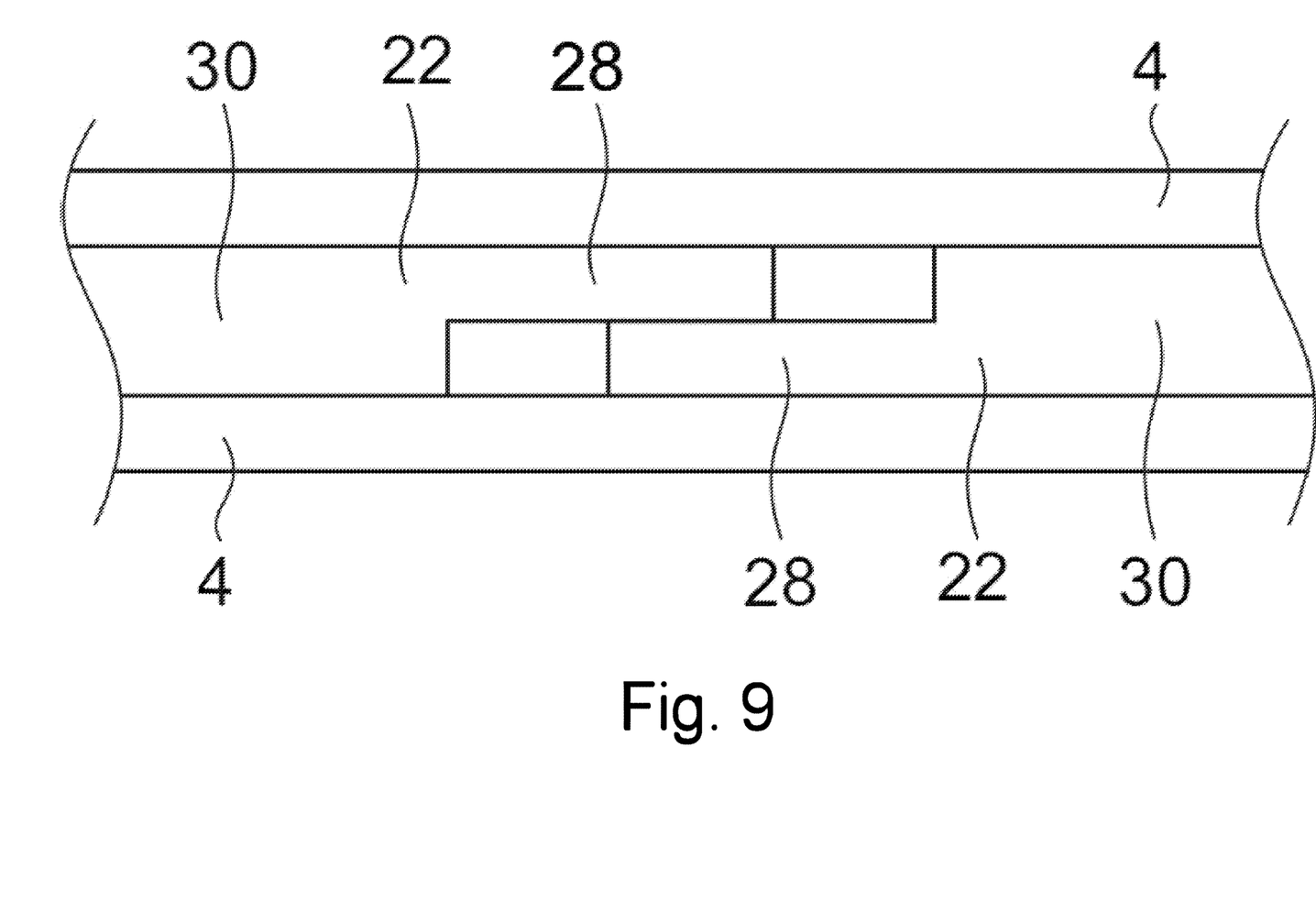
FIG. 9 shows a top enlarged view of adjacent transmission elements overlapping.

FIG. 9 illustrates that, when the adjusting elements 10 of the first, second and third embodiments of the closure apparatus is in its first position, the respectively adjacent transmission elements 22 overlap by way of in each case one side section 28 in the axial direction. A middle section 30 is situated between two side sections 28. The thickness of the side sections 28, which thickness is measured in the direction of the closure apparatus centre axis 8, is lower than the thickness of the middle section 30 by half the thickness of the said middle section. Therefore, the side sections which adjoin one another can interengage when the pressing face radius is reduced.

Figure 3A:
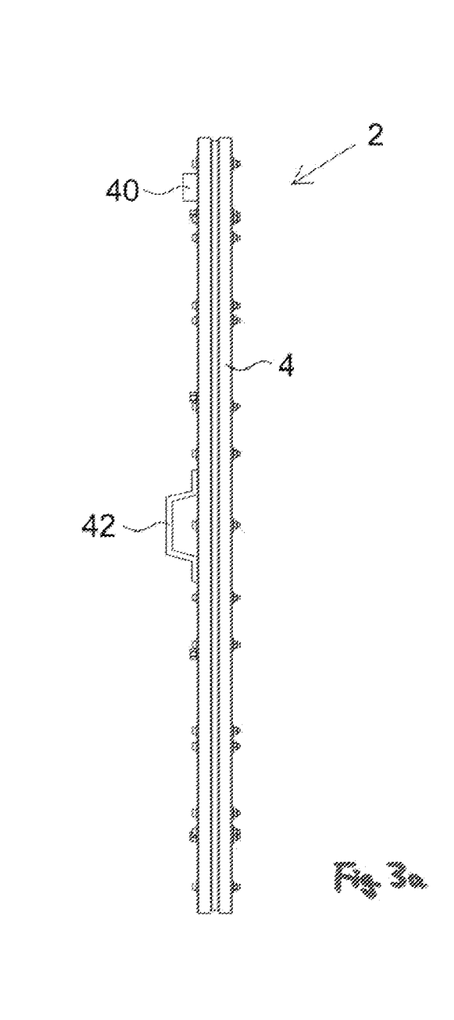
FIG. 3a shows a side view of a second closure apparatus according to the invention with eccentric elements.
Figure 3B:
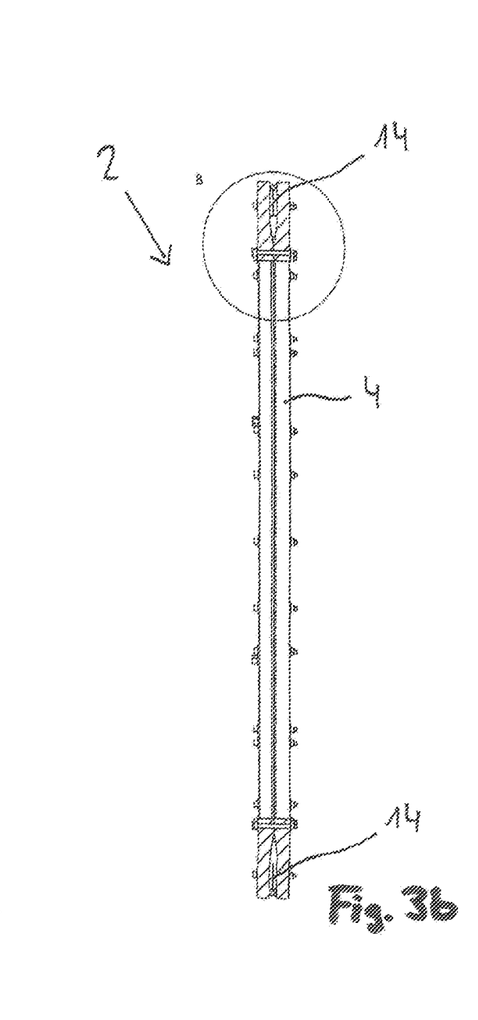
FIG. 3b shows a side view, with broken-away portions, of the second closure apparatus according to the invention.
Figure 3C:
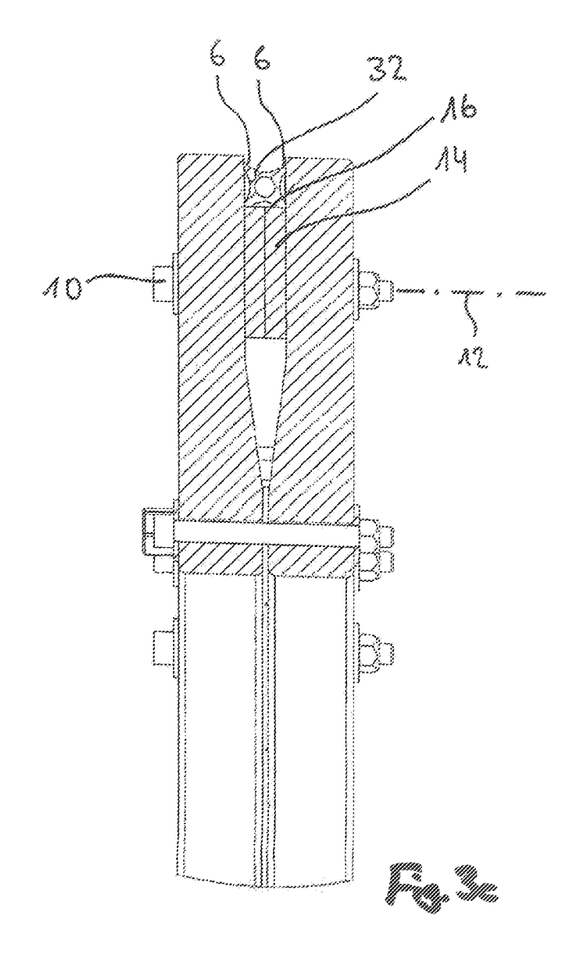
FIG. 3c shows an enlargement of the circled broken-away portion in the side view in accordance with FIG. 3b.

In all illustrated embodiments, the closure apparatus 2 has a sealing element 32 (cf. FIG. 3c and FIG. 8a in particular). The sealing element 32 is an annular seal which encircles the closure apparatus centre axis 8 and has, in the embodiment in accordance with FIG. 3c as a cross seal, two sealing contact faces. However, the annular seal shown in the embodiments illustrated by FIGS. 8a and 8b has a round cross section and only one sealing contact face 6. Irrespective of the shape of the sealing element 32, the said sealing element bears against the transmission element 22 (cf. FIG. 8a for example) or the transmission elements 22 (cf. FIGS. 2a and 5b for example). In each illustrated embodiment, the closure apparatus 2 has a gas-permeable membrane 34 which is arranged on the support element 4 and serves to render possible the passage of gas through the closure apparatus 2.

FIG. 4 shows an optical indicator 36 on the adjusting element 10. The said optical indicator is a coloured-in region of the surface of the adjusting element 10, which coloured-in region is moved when the adjusting element is moved from the first to the second position. Owing to the movement, the coloured-in region is moved from a position in which it is hidden by the support element to a position in which it is congruent with a recess, which is comprised by the optical indicator 36, in the support element 4. In FIG. 1, these recesses are illustrated over half of the support element 4. Therefore, the position of the closure element can be identified from the outside owing to this optical indicator 36.

FIG. 9 illustrates that energy may be released by at least one energy store 40 when the second position of the adjusting element 10 is reached. This energy serves to produce the sealing position. The energy store 40 may be a spring which is in a tensioned state provided that the adjusting element is arranged in its first position. When the second position of the adjusting element 10 is reached, the spring is released and stored energy is released by the said spring. The force which is exerted by the energy store 40 creates a surface pressure on the sealing contact face 6. This embodiment of the closure apparatus 2 can be fitted in a particularly simple and quick manner since the fitter does not have to introduce any force into the closure apparatus 2 for the purpose of producing the required surface pressure. Furthermore, the energy store 40 can be set such that homogeneous surface pressure of an optimum magnitude is achieved in this way, this ensuring particularly reliable sealing off. Also, at least one handle 40 may be arranged on the support element 4. The fitter can use these handles 40 to position the closure apparatus 2, which is to be fitted, within the pipe in a particularly simple manner.

The invention claimed is:

1. A closure apparatus for closing a pipe, the closure apparatus comprising:
a support element;
at least one sealing contact face and a closure apparatus centre axis;
at least one operating apparatus with at least one adjusting element which can be moved from a first position to a second position relative to the support element,
at least two transmission elements;
wherein the closure apparatus is in a sealing position in the second position of the adjusting element;
wherein the adjusting element is pivotable or rotatable about an operating axis relative to the support element, wherein the operating axis is parallel to but radially spaced apart from the closure apparatus centre axis; and
wherein the operating apparatus comprises an eccentric element associated with the at least one adjusting element, wherein the eccentric element can be pivoted about the operating axis, wherein a sliding surface of the eccentric element, which is averted from the operating axis, is at a varying distance from the operating axis;
wherein at least when the adjusting element is in the first position, two adjacent transmission elements of the at least two transmission elements overlap by way of in each case one side section when the said transmission elements are viewed along the closure apparatus centre axis;
wherein at least when the adjusting element moves to the second position, each transmission element moves radially away from the closure apparatus centre axis, thereby placing the closure apparatus into the sealing position when the adjusting element is in the second position; and
wherein at least in the sealing position, pressing faces of the at least two transmission elements form a circle when viewed along the closure apparatus centre axis.

2. The closure apparatus according to claim 1, wherein the operating apparatus comprises a pushing element which can be moved parallel to the operating axis and of which a sliding surface which is averted from the operating axis is at a varying distance from the operating axis.

3. The closure apparatus according claim 1, wherein at least one of said transmission elements is shifted in a translatory manner by movement of the at least one adjusting element between the first position and the second position, movement of the at least one transmission element being parallel to a transmission axis.

4. The closure apparatus according to claim 3, wherein the transmission axis is arranged in a manner tilted by 80° to 100° relative to the closure apparatus centre axis.

5. The closure apparatus according to claim 3, wherein the transmission axis is arranged parallel to the closure apparatus centre axis.

6. The closure apparatus according to claim 3, wherein at least one of said transmission elements is arranged in a manner bearing against the sliding surface, wherein the transmission element is shifted by the movement of the sliding surface.

7. The closure apparatus according to claim 3, wherein at least one guide arrangement which guides the movement of at least one of said transmission elements parallel to the transmission axis is arranged between the support element and the transmission element.

8. The closure apparatus according to claim 3, further including at least a third transmission element, said transmission elements including, in each case, at least one pressing face which is averted from the closure apparatus centre axis and, in the sealing position of the closure apparatus, differs from an imaginary circular-cylindrical lateral surface that would be formed by transmission elements if their axis of symmetry were to coincide with the closure apparatus centre axis, by at most one fifth of the radius of the circular-cylindrical lateral surface, or is equal to the imaginary circular-cylindrical lateral surface.

9. The closure apparatus according to claim 8, wherein when viewed along the closure apparatus centre axis, the pressing faces of the transmission elements run around the closure apparatus centre axis over a majority of an outer circumference of the closure apparatus to make flush contact with a pipe inner face in a circumferential direction, wherein the flush contact with the pipe inner face is made directly by the pressing faces or by one or more separate sealing elements positioned between the pipe inner face and the pressing faces.

10. The closure apparatus according to claim 1, wherein the transmission elements have two side sections which adjoin a middle section, wherein the thickness of the side sections, which thickness is measured along the closure apparatus centre axis, is lower than the thickness of the middle section by at least one third the thickness of the said middle section.

11. The closure apparatus according to claim 1, wherein the adjusting element can be moved from the first to the second position by a movement in a pushing plane which is orthogonal to the closure apparatus centre axis in a direction which is tilted through 70° to 110° in relation to the closure apparatus centre axis.

12. The closure apparatus according to claim 1, further including at least one energy store which releases energy when the second position of the adjusting element is reached.

13. The closure apparatus according to claim 1, further including at least one sealing element which has the sealing contact face.

14. The closure apparatus according to claim 13, wherein the closure apparatus has precisely one sealing element which is designed as an annular seal that encircles the closure apparatus centre axis and which has the at least one sealing contact face.

15. The closure apparatus according to claim 13, wherein the sealing element is arranged so as to bear at least partially against a transmission element in the sealing position.

16. The closure apparatus according to claim 1 wherein the support element includes a polypropylene/glass fibre composite.

17. The closure apparatus according to claim 1, further including an optical indicator which indicates the position of the adjusting element.

18. The closure apparatus according to claim 1, wherein a gas-permeable membrane for rendering possible the passage of gas through the closure apparatus is arranged on the support element.

19. The closure apparatus according to claim 1, further including handles which are arranged on the support element.

* * * * *